(12) United States Patent
Biswas et al.

(10) Patent No.: US 12,202,335 B2
(45) Date of Patent: Jan. 21, 2025

(54) SYSTEM FOR MAN-MACHINE INTERACTION IN VEHICLES

(71) Applicants: INDIAN INSTITUTE OF SCIENCE, Bangalore Karnataka (IN); FAURECIA INDIA PRIVATE LIMITED, Bhosari Pune Maharashtra (IN)

(72) Inventors: Pradipta Biswas, West Bengal (IN); Sachin Deshmukh, Maharashtra (IN); Gowdham Prabhakar, Tamil Nadu (IN); Modiksha Madan, Madhya Pradesh (IN); Aparna Ramakrishnan, Karnataka (IN); Vinay Krishna Sharma, Uttar Pradesh (IN)

(73) Assignees: INDIAN INSTITUTE OF SCIENCE, Bangalore Karnataka (IN); FAURECIA INDIA PRIVATE LIMITED, Bhosari Pune Maharashtra (IN)

( * ) Notice: Subject to any disclaimer, the term of this patent is extended or adjusted under 35 U.S.C. 154(b) by 431 days.

(21) Appl. No.: 17/437,003

(22) PCT Filed: Jan. 14, 2020

(86) PCT No.: PCT/IB2020/050253
§ 371 (c)(1),
(2) Date: Sep. 7, 2021

(87) PCT Pub. No.: WO2020/183249
PCT Pub. Date: Sep. 17, 2020

(65) Prior Publication Data
US 2022/0176817 A1 Jun. 9, 2022

(30) Foreign Application Priority Data
Mar. 8, 2019 (IN) .............................. 201941009219

(51) Int. Cl.
G06F 3/0346 (2013.01)
B60K 35/00 (2006.01)
(Continued)

(52) U.S. Cl.
CPC .............. *B60K 35/00* (2013.01); *G06F 3/013* (2013.01); *G06F 3/04812* (2013.01);
(Continued)

(58) Field of Classification Search
None
See application file for complete search history.

(56) References Cited

U.S. PATENT DOCUMENTS

2013/0009761 A1\* 1/2013 Horseman ............ A61B 5/6893
340/576
2014/0285418 A1 9/2014 Adachi
(Continued)

FOREIGN PATENT DOCUMENTS

| CN | 101344816 A | 1/2009 |
|---|---|---|
| CN | 104866106 A | 8/2015 |

(Continued)

OTHER PUBLICATIONS

International Search Report corresponding to International Application No. PCT/IB2020/050253, dated Apr. 16, 2020, 3 pages.
(Continued)

*Primary Examiner* — Carl Adams
(74) *Attorney, Agent, or Firm* — Reising Ethington P.C.

(57) ABSTRACT

A system for man-machine interaction for a vehicle is disclosed. The proposed system includes an interactive reflected display on a windscreen of the vehicle; an eye tracking module including an eye gaze tracker for tracking eye gaze direction of a user, and a training unit to train the tracking module using a neural network to predict a real-time set of coordinates for eye gaze direction of the user
(Continued)

based on a created reference data set of coordinates of the display; a finger tracking module to detect presence of a finger of the user and track movement of the finger; a cursor module configured to, on the basis of a received input, move a cursor on the display to an area of interest on the display; and a wireless switch module operatively coupled to the display for selecting a target in the area of interest on the display.

11 Claims, 12 Drawing Sheets

(51) Int. Cl.
*G06F 3/01* (2006.01)
*G06F 3/04812* (2022.01)
*G06F 3/0488* (2022.01)
*G06N 3/08* (2023.01)
*B60K 35/10* (2024.01)
*B60K 35/23* (2024.01)
*B60K 35/29* (2024.01)

(52) U.S. Cl.
CPC ............. *G06F 3/0488* (2013.01); *G06N 3/08* (2013.01); *B60K 35/10* (2024.01); *B60K 35/23* (2024.01); *B60K 35/29* (2024.01); *B60K 2360/1438* (2024.01); *B60K 2360/149* (2024.01); *B60K 2360/191* (2024.01)

(56) References Cited

U.S. PATENT DOCUMENTS

| | | |
|---|---|---|
| 2015/0234515 A1 | 8/2015 | Gasser |
| 2015/0261295 A1 | 9/2015 | Lee |
| 2016/0063303 A1 | 3/2016 | Cheung et al. |
| 2018/0314329 A1 | 11/2018 | Bychkov et al. |
| 2020/0409481 A1* | 12/2020 | Henrikson .............. G06F 3/013 |

FOREIGN PATENT DOCUMENTS

| | | |
|---|---|---|
| CN | 106796449 A | 5/2017 |
| WO | 2014067803 A1 | 5/2014 |

OTHER PUBLICATIONS

Written Opinion corresponding to International Application No. PCT/IB2020/050253, dated Apr. 16, 2020, 3 pages.

* cited by examiner

SYSTEM FOR MAN-MACHINE INTERACTION IN VEHICLES

TECHNICAL FIELD

The present disclosure generally relates to the technical field of infotainment systems in vehicles. In particular, the present disclosure relates to a system for controlling an infotainment system by eye gaze and finger movement in a vehicle.

BACKGROUND

Background description includes information that may be useful in understanding the present invention. It is not an admission that any of the information provided herein is prior art or relevant to the presently claimed invention, or that any publication specifically or implicitly referenced is prior art.

In-vehicle entertainment or infotainment systems include hardware and software that provides audio or video entertainment and information to users/passengers/occupants of the vehicle. The typical infotainment systems use electronic screens or head up displays as output modalities while input is taken through touch screen, physical buttons and voice recognition technologies. To facilitate human-machine interaction, researchers have already explored use of haptic feedback/haptics, hand gesture tracking based input, personalizing instrument displays, and predictive models to help driver in regular driving tasks such as parking. However, every infotainment system control is based on visual displays and visual feedback, and no infotainment system can completely exclude visual displays and visual feedback.

Recent advancement in infra-red based eye gaze trackers has significantly increased research and industrial use of gaze tracking technology. Eye tracking is the process of measuring either the point of gaze (where one is looking) or the motion of an eye relative to the head of the user. An eye tracker is a device for measuring eye positions and eye movement. Research on developing the eye tracker investigates reducing the cost of existing infra-red based trackers as well as increasing their accuracy. Typical/existing eye gaze trackers used infra-red cameras to track the eye gaze of users. However accurately tracking eye gaze in different conditions of ambient light is a challenging problem. The most commonly used technique is pupil centre and corneal reflection technique. The eye gaze tracker has inbuilt Infrared LED (Light Emitting Diode) that illuminates the eye and infrared-sensitive video takes rapid pictures of eye. The LED reflects small amount of light off the cornea and through the pupil onto the retina. The bright pupil allows image processor to locate centre of pupil. The eye gaze tracker can then locate where the person is looking on the screen based on the relative positions of the pupil centre and corneal reflection within the video image of the eye. A simple calibration procedure that requires users to follow (means staring at) a shape around screen or a designated position in space tunes parameters for each individual user with respect to the two-dimensional screen or three dimensional space.

Although research involving analysis of eye gaze dates back to early 19th century, until recently the typical eye gaze trackers are mainly used for analysing ocular parameters for reading and a variety of human-machine interface (HMI) tasks. With progress in processor speed and image processing algorithms, it has also become possible to use the gaze tracking technology in real time to control a screen pointer in a direct manipulation interface.

The typical infotainment systems and other electronic systems in vehicles/automobiles facilitate driving at the cost of adding secondary tasks in addition to the primary task of driving to a driver of the vehicle. The secondary tasks have considerable chance to distract the driver from his primary driving task, thereby reducing safety or increasing cognitive workload. The typical infotainment systems use electronic screens configured at vehicle dashboard as output modalities while input is taken through touch screen, physical buttons and voice recognition technologies. Drivers need to take their eyes off the road and physically touch the dashboard to operate the infotainment system. Nowadays drivers often put their electronic devices such as iPad or smartphone on top of the dashboard to avoid looking down but the device itself occlude a part of the windscreen. Additionally, the voice output system is not often useful for different language speakers and in noisy environment.

There is therefore a need in the art to provide an intelligent gaze and finger controlled responsive head up display in a vehicle which facilitates a driver to control a vehicle infotainment system either just by looking at the display or small finger movements.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding-off techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general objective of the present disclosure is to mitigate problem of operator's distraction from his primary task of driving while interacting with a display for secondary task in vehicle by alleviating need to look down the display and physically touch the interface.

An object of the present disclosure is to provide an Intelligent Gaze Controlled Head Up Display System in an automotive to alleviate need to physically touch the interface.

An object of the present disclosure is to provide an Intelligent Gaze Controlled Head Up Display System with a display on the windscreen without obstructing view of the road or the sky ahead.

Another object of the present disclosure is to provide a Head Up Display System that integrates finger tracking as an alternative to gaze tracking based control.

Another object of the present disclosure is to provide a system that integrates dual control for movement of the curser/pointer based on position of eye gaze as well as finger tracking.

SUMMARY

Aspects of the present disclosure relate to a system for man-machine interaction in a vehicle. In particular, the disclosed system mitigate driver's distraction from the driving task by simplifying human-machine interaction by alleviating the need to look down the display and physically touch the interface.

In an aspect, the disclosed system includes an interactive reflected display on a curved and inclined semi-transparent sheet such as a windshield of the vehicle; an eye gaze tracking module comprising an eye gaze tracker for tracking eye gaze direction of a user, wherein a training unit is adapted to train the tracking module using a neural network to predict a real-time set of coordinates for eye gaze direction of the user based on a created reference data set of coordinates of the display.

In an aspect, the disclosed system can include a finger tracking module having a finger tracking sensor to detect presence of a finger of the user and track movement of the finger; a cursor module configured to, on the basis of a received input, move a cursor on the display to an area of interest on the display; and a wireless switch module operatively coupled to the interactive reflected display.

In an aspect, the reference data set of coordinates of the display can be created based on a set of coordinates for the display determined by the eye gaze tracker for a corresponding eye gaze direction for each of a plurality of test users.

In an aspect, the input of the cursor module is any of an eye gaze direction of user from the eye gaze tracker and the presence of finger from the finger tracking sensor.

In an aspect, a precedence is given to signal from the finger tracker over a signal from eye gaze tracker and position of the cursor on the display is corrected based on detected movement of the finger by moving the cursor in direction of detected movement of the finger. In an aspect, when the finger tracker does not locate the finger of the user within its field, the system resumes to move the cursor based on the detected direction of the eye gaze of the user.

In an aspect, the interactive reflected display is reflection from a screen of a display device on the curved windscreen of a vehicle. In an embodiment, the display device can be selected form a group consisting of a tablet computer, personal digital assistance, and a mobile smart phone. The interactive reflected display allows unhindered view of road/sky ahead to a driver while also providing information in form of a display on the transparent sheet. The information displayed on the sheet can be, for example, various options for selection by the driver being part of infotainment system of the vehicle.

In an aspect, the selection of various options on the display can be based on the cursor that moves to various options, and once positioned on a desired option, the desired option can be selected by clicking the wireless switch module, located at a convenient position for the driver to actuate without taking his eye off from primary task of driving. In an embodiment, the wireless switch module can be configured with a steering wheel of the vehicle.

In an aspect, the system includes a processor operatively coupled to eye gaze tracking module, the finger tracking module, the interactive reflected display, the cursor module and the wireless switch module.

In an aspect, the system further includes a median filter configured to take median of pixels of continuously recorded eye gaze positions on the display by the eye gaze tracker.

In an aspect, the system incorporates a target prediction unit that highlights a clickable object nearest to the cursor position on the display to the area of interest on the display.

In an aspect, the highlighting of the clickable object is based on hotspots associated with each of the clickable objects, wherein a clickable object whose hotspot is closest to the pixel location arrived at based on combination of the eye gaze and the detected finger movement is highlighted.

In an embodiment, the hotspots associated with different clickable objects are selected based on minimizing value of cost function:

$$\sum_{\forall d_{ij}} \frac{1}{d_{ij}^2},$$

where $d_{ij}$ is distance between new hotspots on clickable objects i and j.

In an embodiment, a new hotspot can be selected even if increasing value of the cost function, based on the following condition:

$$e^{\frac{(oldCostFn - newCostFn)}{T}} > \text{a random number between 0 and 1}.$$

where T runs from 5000 to 1 and reduced by 1 in each iteration.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

FIG. 6 illustrates an exemplary schematic diagram representation of a wireless switch module of the proposed system, in accordance with an embodiment of the present disclosure.

DETAILED DESCRIPTION

Figure 1:
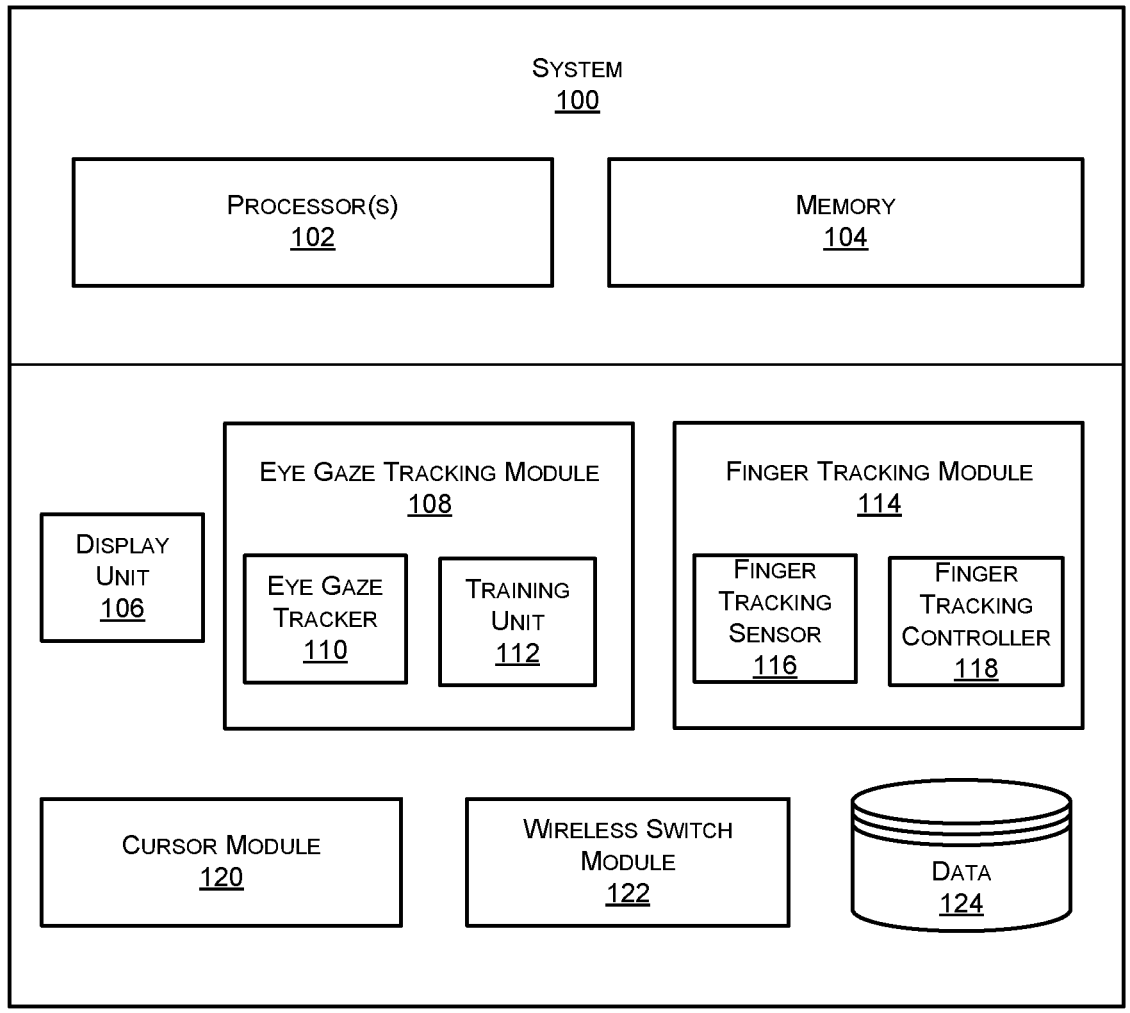
FIG. 1 illustrates an exemplary module diagram of the proposed system for controlling an infotainment system by eye gaze and finger movement in a vehicle, in accordance with an embodiment of the present disclosure.

The following is a detailed description of the embodiments of the disclosure depicted in the accompanying drawings. The embodiments are in such detail as to clearly communicate the disclosure. However, the amount of detail offered is not intended to limit the anticipated variations of the embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Embodiments explained herein relate to a multi-modal interface system for a vehicle environment. In particular, it discloses a system to mitigate driver's distraction from the driving task by simplifying human-machine interaction in automotive environments by alleviating the need to look down towards display and physically touch the interface. The proposed system provides an interactive eye gaze and finger controlled head up display (HUD) for controlling an infotainment system in the vehicle.

It is to be appreciated that though various embodiments have been explained here with reference to application of system of the present disclosure in vehicle environment for operating an infotainment system, they can with suitable modifications that would be apparent to those skilled in the art, be applied for other similar applications such as in aircrafts and all such applications are well within the scope of the present disclosure without any limitations.

In an embodiment, the proposed system can include an interactive reflected display (also referred to as head up display (HUD) hereinafter) on a curved and/or inclined semi-transparent sheet; an eye gaze tracking module comprising an eye gaze tracker for tracking eye gaze direction of a user, wherein a training unit is adapted to train the tracking module using a neural network to predict a real-time set of coordinates for eye gaze direction of the user based on a created reference data set of coordinates of the display In an aspect, the proposed system can include a finger tracking module having a finger tracking sensor to detect presence of a finger of the user and track movement of the finger; a cursor module configured to, on the basis of a received input, move a cursor on the display to an area of interest on the display; and a wireless switch module operatively coupled to the interactive reflected display.

In an embodiment, the reference data set of coordinates of the display can be created based on a set of coordinates for the display determined by the eye gaze tracker for a corresponding eye gaze direction for each of a plurality of test users.

In an embodiment, the input of the cursor module can be any of an eye gaze direction of user from the eye gaze tracker and the presence of finger from the finger tracking sensor.

In an embodiment, a precedence is given to signal from the finger tracker over a signal from eye gaze tracker and position of the cursor on the display is corrected based on detected movement of the finger by moving the cursor in direction of detected movement of the finger.

In an embodiment, when the finger tracker does not locate the finger of the user within its field, the system resumes to move the cursor based on the detected direction of the eye gaze of the user.

In an embodiment, the head up display can be reflection from a screen of a display device on the curved windscreen of a vehicle.

In an embodiment, the display device can be selected form a group consisting of a tablet computer, personal digital assistance, and a mobile smart phone. The interactive reflected display allows unhindered view of road/sky ahead to a driver while also providing information in form of a display on the transparent sheet. The information displayed on the sheet can be, for example, various options for selection by the driver being part of infotainment system of the vehicle.

In an embodiment, the HUD can also estimate drivers' cognitive load and distraction level. HUD can be placed even out of the reach of the driver, and can relieve drivers from taking their hands off from steering wheel or gear handle which may reduce response times. The HUD can be helpful for elderly driver who has reduced range of motion at shoulder due to age related physical impairment like arthritis.

In an aspect, the selection of various options on the display can be based on the cursor that moves to various options, and once positioned on a desired option, the desired option can be selected by clicking the wireless switch module, located at a convenient position for the driver to actuate without taking his eye off from primary task of driving. In an embodiment, the wireless switch module can be configured with a steering wheel of the vehicle.

In an embodiment, the system include a processor operatively coupled to eye gaze tracking module, the finger tracking module, the interactive reflected display, the cursor module and the wireless switch module. In an embodiment, system can include a set of other sensors such as but not limited to, a vibration sensor, a light sensor and the like.

In an aspect, the system further includes a median filter configured to take median of pixels of continuously recorded eye gaze positions on the display by the eye gaze tracker.

In an aspect, the system incorporates a target prediction unit that highlights a clickable object nearest to the cursor position on the display to the area of interest on the display.

In an aspect, the highlighting of the clickable object is based on hotspots associated with each of the clickable objects, wherein a clickable object whose hotspot is closest to the pixel location arrived at based on combination of the eye gaze and the detected finger movement is highlighted.

FIG. 1 illustrates an exemplary module diagram of the proposed system for controlling an infotainment system by eye gaze and finger movement, in accordance with an embodiment of the present disclosure. The disclosed system 100 can include a display unit 106 configured for providing an interactive reflected display also referred to as head up display (HUD), or display hereinafter) on a curved and/or inclined semitransparent sheet such as a windscreen of a vehicle; an eye gaze tracking module 108 including an magnetic eye gaze tracker 110 for tracking eye gaze direction of a user on the display, and a training unit 112 to train the tracking module 108 using a neural network to predict a real-time set of coordinates for eye gaze direction of the user based on a created reference data set of coordinates of the display; and a database 124 for storing the reference data set of coordinates of the display.

In an embodiment, the reference data set of coordinates of the display can be created based on a set of coordinates for the display determined by the eye gaze tracker 110 for a corresponding eye gaze direction for each of a plurality of test users.

In an embodiment, the system 100 can include a finger tracking module 114 including a finger tracking sensor 116 to detect presence of a finger of the user and track movement of the finger, and a finger tracking controller 118; a cursor module 1120 configured to, on the basis of a received input, move a cursor on the display to an area of interest on the display; and a wireless switch module 122 operatively coupled to the interactive reflected display. The wireless switch module 122 is configured for selecting a target in the area of interest on the display based on position of the cursor on the display.

In an embodiment, the system 100 can include one or more processors 102 operatively coupled to eye gaze tracking module 108, the finger tracking module 114, the display unit 106, the cursor module 120 and the wireless switch module 122, data base 124; and one or more memory units 104 coupled to the data base 124 to execute the one or more subroutines for the eye gaze tracking module 108, the finger tracking module 114, and the display unit 106. In another embodiment, the memory units 104 can be cache memory.

In an embodiment, the database 114 can include a non-transitory storage device embodied with one or more subroutines for the display unit 106, the eye gaze tracking module 108, the finger tracking module 114 and the cursor module 120.

In another embodiment, the database 114 is operatively coupled to the different components of the vehicle such as sensors, control units and the like, and holds information in real time about the different aspects of vehicle infotainment systems functioning as determined from the above stated components.

In another embodiment, the input of the cursor module 120 can be any of an eye gaze direction of user from the eye gaze tracker 110 and the presence of finger from the finger tracking sensor 116.

In an embodiment, the reference data set of coordinates of the display can be created based on a set of coordinates for the display determined by the eye gaze tracker 110 for a corresponding eye gaze direction for each of a plurality of test users.

In an embodiment, the display unit 106 can be selected form a group consisting of a tablet computer, personal digital assistance, and a mobile smart phone.

In an embodiment, the system 100 can include a median filter configured to take median of pixels of continuously recorded eye gaze positions on the display by the eye gaze tracker 110.

In an embodiment, the system 100 can incorporate a target prediction unit that highlights a clickable object nearest to the cursor position on the display to the area of interest on the display. In an embodiment, the highlighting of the clickable object on the display is based on hotspots associated with each of the clickable objects.

Figure 2:
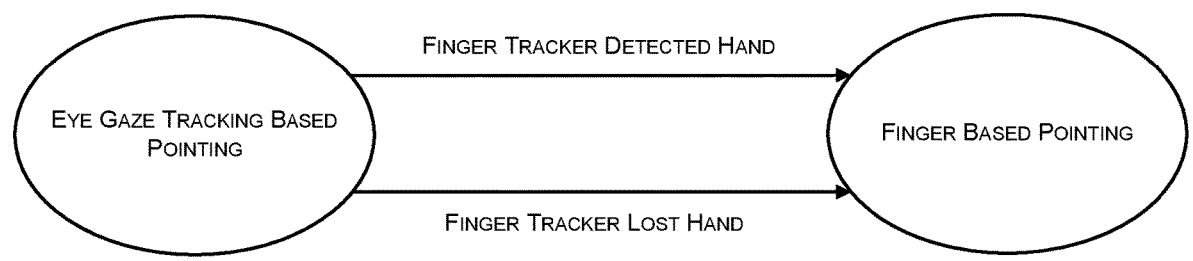
FIG. 2 illustrates an exemplary block diagram showing relationship between eye gaze tracking based cursor movement and finger tracking based cursor movement in accordance with embodiments of the present disclosure.

FIG. 2 illustrates an exemplary block diagram 200 showing relationship between eye gaze tracking based cursor movement and finger tracking based cursor movement in accordance with embodiments of the present disclosure. As shown if finger movement signal is simultaneously found with eye gaze signal, the system 100 gives precedence to the finger movement and the system stops moving the cursor based on eye gaze signal from the eye gaze tracker 110. On the other hand when finger tracking sensor 116 does not locate hand within its field the system can resume to move the cursor based on eye gaze of user.

In an embodiment, a set of equations to take an orthogonal projection of 3-dimensional finger position measured using the finger tracking controller 118 on a 2-dimensional screen can include:

$$ScreenX = \frac{ScreenWidth}{w} \times (finger \cdot TipPosition \cdot x + a)$$

$$ScreenY = \frac{ScreenHeight}{h} \times (b + c \times finger \cdot TipPosition \cdot y - d \times finger \cdot TipPosition \cdot z)$$

where constants a, b, c, d, w and h were calculated based on the relative screen position with respect to the finger tracking sensor.

Thus the user on finding that cursor is not correctly positioned can simply place his hand/finger on finger tracking sensor 116 and move his finger such as index finger to correct the position and thereafter remove his hand from the finger tracking sensor 116. The resulting system thus reduces the number of times a user needs to take his eyes off from his primary task of driving and can interact with the reflected display simply by looking at it or through moving his index finger.

Figure 3:
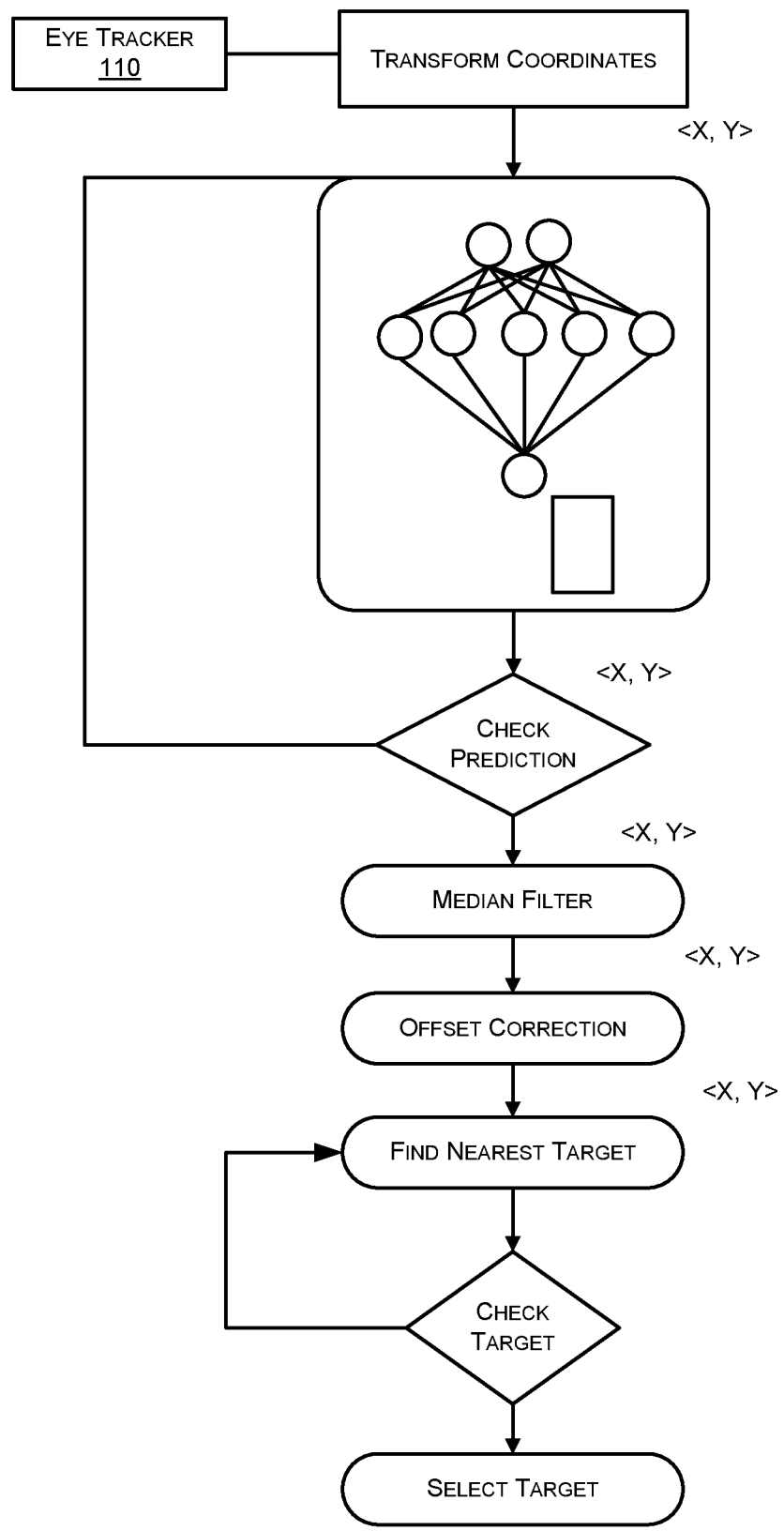
FIG. 3 illustrates an exemplary flow diagram showing working of the proposed eye gaze controlled display system in accordance with embodiments of the present disclosure.

FIG. 3 illustrates an exemplary flow diagram 300 showing working of the proposed eye gaze controlled display system in accordance with embodiments of the present disclosure. As shown the eye gaze tracker 110 records the eye gaze coordinates/direction continuously on the display (also referred to as screen hereinafter). In an exemplary embodiment, a socket program using application programming interface (API) can be used for the eye gaze tracker 110, and transformation of the output of the raw gaze coordinates can be done based on screen resolution and zooming level of the rendering device.

In an exemplary embodiment, transformation can include multiplying normalized coordinates by fixed constant and add fixed offset if the screen is inverted for mirroring on the display. In an embodiment, a 9-point calibration application can be used to display nine squares one at a time on the screen. In an exemplary embodiment, each of the nine squares can be of size 50×50 pixels and displayed for duration of 2.5 secs. In an exemplary embodiment, the users can be instructed to fixate attention on the square. The user's eye gaze can be recorded for each square and the median gaze position can be calculated for last 2 secs of a square's displayed duration.

In an embodiment, an input files can be set up for the system by recording the mid points of each square and the median gaze coordinates recorded by the gaze tracker 110 transmitted by the socket program.

In an exemplary embodiment, data from 8 users can be recorded using a screen mounted (Tobii PC EyeX Mini, accuracy 0.3° of visual angle, frequency 30 Hz) eye gaze tracker.

In an embodiment, four combinations of input and output can be used such as (a) predicting x-coordinate in screen from x coordinate recorded by gaze tracker, (b) predicting x-coordinate in screen from x and y coordinates recorded by gaze tracker, (c) predicting y-coordinate in screen from y coordinate recorded by gaze tracker and (d) predicting y-coordinate in screen from x and y coordinates recorded by gaze tracker.

In an exemplary embodiment, for each combination of the four combinations, training of a linear regression and neural network model can be done with 9 data points recorded from the calibration program separately for each participant. In an exemplary embodiment, a film function in MATLAB can be used for creating a linear regression model.

In an exemplary embodiment, an artificial neural network can be set up with a single hidden layer with five neurons using Google Tensor Flow. In an exemplary embodiment, the learning rate can be set at 0.01 and the model can be trained for 1000 epochs. In an exemplary embodiment, the Gradient Descent Optimizer from Tensor Flow API can be used for this purpose.

Figure 4A:
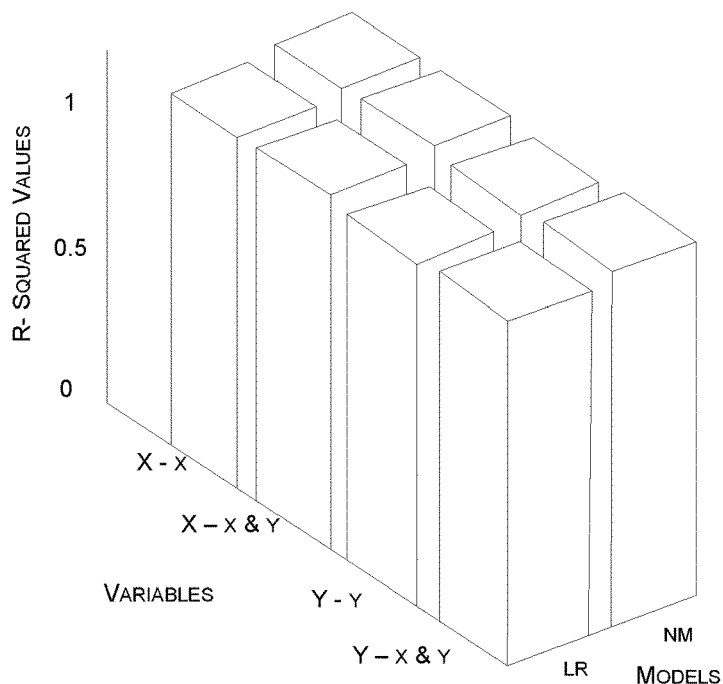
FIGS. 4A and 4B illustrate exemplary bar charts showing R-square values and RMS error values respectively of an eye gaze tracking module of the proposed system, in accordance with an embodiment of the present disclosure.
Figure 4B:
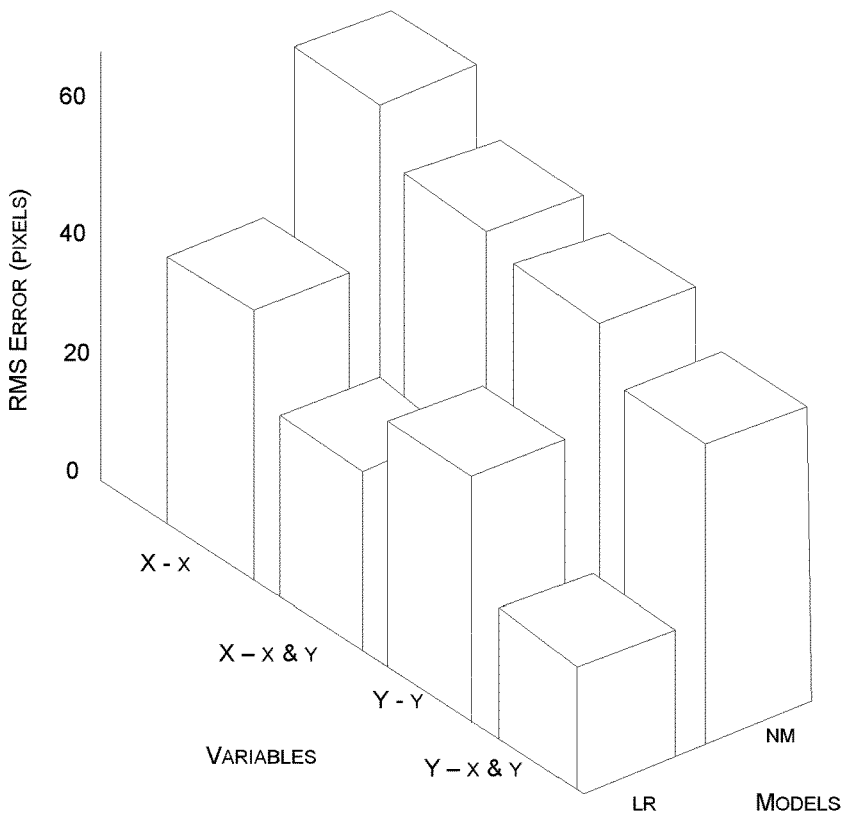

In an embodiment, $R^2$ and RMS error values can be tested for predicted x and y coordinates for the same 9 points used for training of the eye gaze tracking module. In an embodiment, the average $R^2$ and RMS error values can be calculated considering all participants. FIGS. 4A and 4B showing $R^2$ and RMS error values for each case.

In an embodiment, the neural network model taking x and y coordinates as input produces higher value of $R^2$ and lower values for RMS error than the linear regression model in each case (shown in FIGS. 4A and 4B). In an exemplary embodiment, a neural network model can be implemented in C sharp (C #) and can be compared its output with the Tensor Flow models.

In an exemplary embodiment, the cursor module can be implemented in C #and initially runs the 9-points calibration program and uses this to train the neural network. In an embodiment, the eye gaze tracking module can record offset of the predicted values for each 9 points.

In an embodiment, the eye gaze tracking module can check the accuracy of the prediction and returns to the calibration routine if the $R^2$ value of prediction is less than 0.9 and RMS error is greater than 100.

In an embodiment, after successful training of the network, the eye gaze tracking module records gaze coordinates in real time from the gaze tracker 110 and runs the network. For each predicted value, the eye gaze tracking module corrects the offset by comparing the predicted value and the offset from its nearest calibration point. Finally, the eye gaze tracking module activates the target nearest to the present cursor position.

In an embodiment, when a target is activated, the target can be selected by pressing the wireless switch module coupled to the steering wheel of the vehicle.

Figure 5:
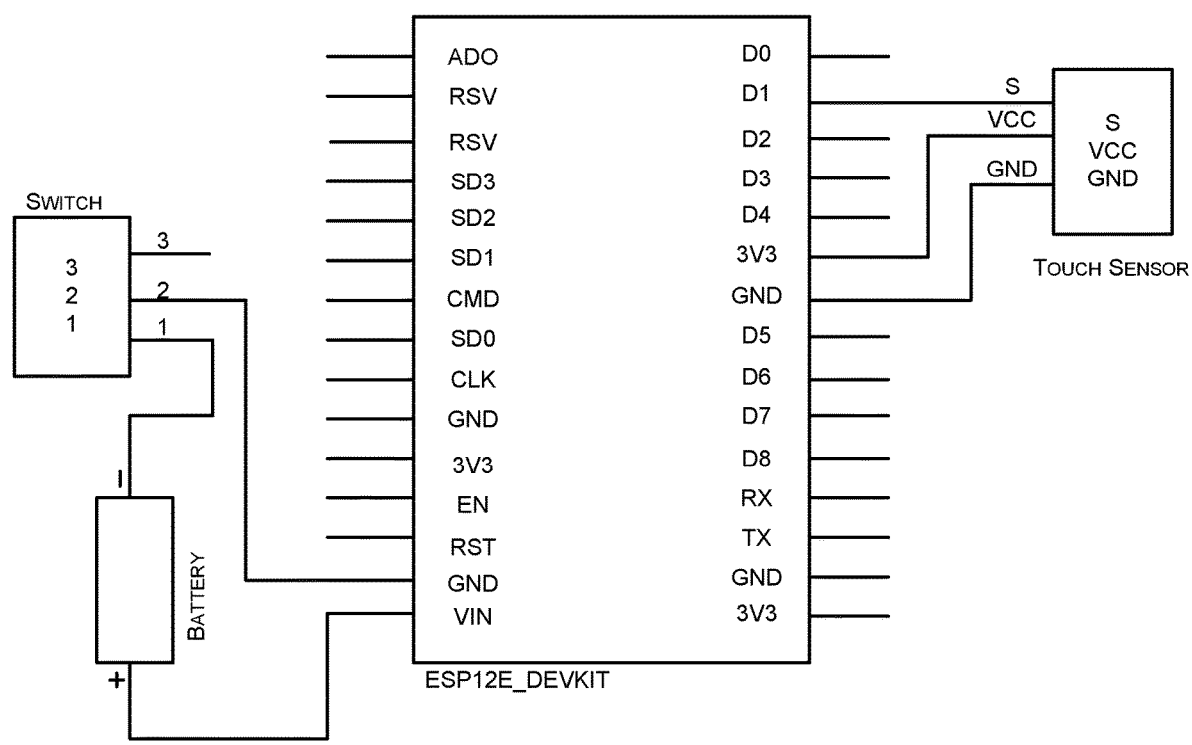
FIG. 5 illustrates an exemplary schematic diagram representation of a wireless switch module of the proposed system, in accordance with an embodiment of the present disclosure.

FIG. 5 illustrates an exemplary schematic diagram representation of a wireless switch module of the proposed system, in accordance with an embodiment of the present disclosure. In an embodiment, a wireless switch module can be designed for performing selection task while undertaking pointing tasks. The wireless switch can include a NodeMCU v1, a limit switch or touch sensor, SPDT switch and a Lipo 3.7v 500 mAh battery. In an embodiment, the NodeMCU uses WiFi to communicate.

In an embodiment, the touch sensor or limit switch is used to initiate the trigger is connected to NodeMCU. The signal pin, Vcc and ground of touch sensor/limit switch are connected to D1, 3v3 and ground of NodeMCU respectively. The positive and negative terminals of battery are connected to Vin and ground pins of NodeMCU via a SPDT switch.

In an embodiment, the NodeMCU can be programmed to act as an access point and a server with the name "Wireless Switch". In an embodiment, the client connecting to the access point can receive "0" until it requests root "I" address of the server. As soon as the switch is triggered from the server, the server sends "1" until the client acknowledges by requesting "/rst" address of the server after which it sends "0". From the client, when it gets "1", the operator presses the trigger switch of the wireless switch module. In an exemplary embodiment, the client program can be written in python using HTTP.

Figure 6A:
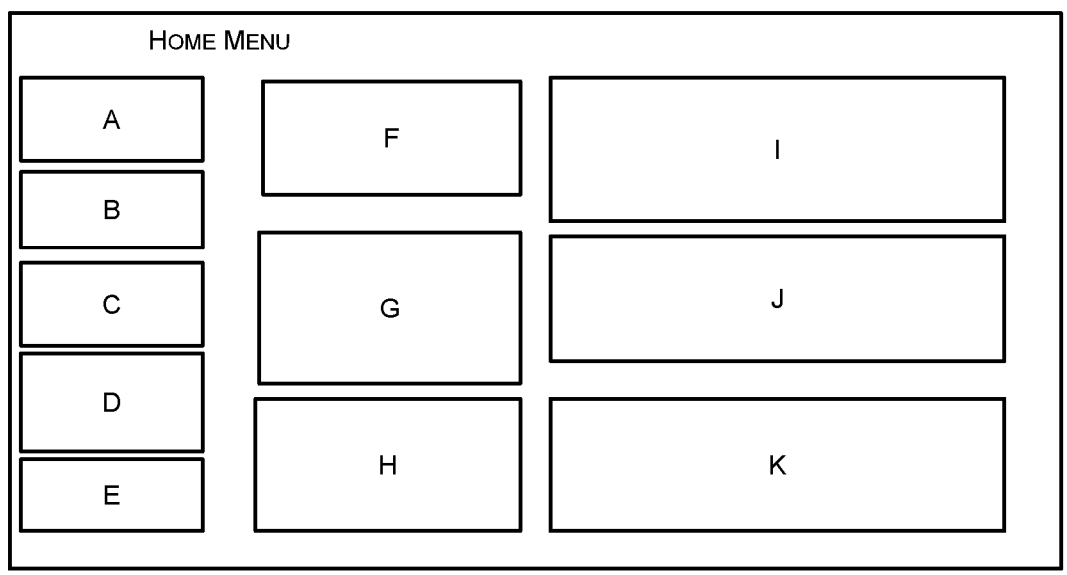
FIGS. 6A and 6B illustrate exemplary representations of a display interface and a graph structure representation of the display interface, respectively, of the proposed the proposed system, in accordance with an embodiment of the present disclosure.
Figure 6B:
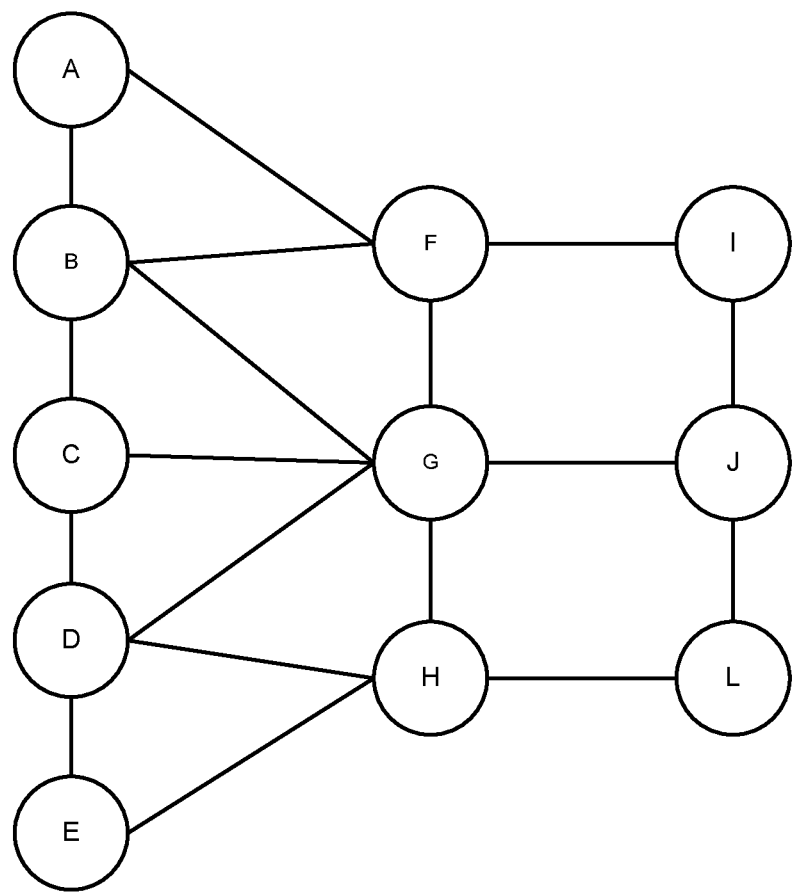

FIGS. 6A and 6B illustrate exemplary representations of a display interface and a graph structure representation of the display interface, respectively, of the proposed proposed system, in accordance with an embodiment of the present disclosure. In an exemplary embodiment, in a gaze controlled interface, when the user stare at the middle of the target, due to the inaccuracy of the tracker or users head movement, the neighbouring button/clickable object can be occasionally selected. In an embodiment, the probability of wrong selection can increase if the buttons are closely spaced in the interface. So that the probability of wrong selection can be reduced by increasing the inter-button spacing.

In an embodiment, a hotspot can be introduced inside each clickable object of the interface to facilitate eye gaze tracking interaction. In another embodiment, a hotspot on each button can be introduced and each button can be kept separate from the adjacent buttons. The users can be instructed such that the first saccade on a button would launch on these hotspots. In an embodiment, keeping these hotspots well separated may reduce chances of wrong selection. The hotspots may not change the size of any screen element or the interface, rather aim to leverage the 'pop-out' effect of parallel visual search.

In an embodiment, the interface be represented as a graph where each node corresponds to a target button (clickable objects) and neighbouring buttons are connected by an edge as shown in FIG. 6B.

In an embodiment, each button of the interface can include a hotspot on it such that the hotspots can be initially located at the centre of the buttons. The weight of each edge can be equal to the Euclidian distance between the hotspots of two neighbouring buttons. In an embodiment, different algorithms can be used to increase the distances between hotspots. In an exemplary embodiment, the hotspots associated with different clickable objects are selected based on minimizing value of cost function.

$$\text{Cost Function} = \sum\nolimits_{\forall d_{ij}} \frac{1}{d_{ij}^2},$$

where $d_{ij}$ is the distance of the hotspots between buttons i and j and is equal to the weight of the edge between nodes i and j.

In an exemplary embodiment, Optimum location of hotspots can be modelled as a state space. Each state can correspond to a particular organization of hotspots. A state transition occurs when any hotspot changes its position. If each button has k possible positions and if an interface has n buttons, then an exhaustive search algorithm needs to evaluate kn states. In an exemplary embodiment, the algorithm can be used such as, but not limited to, a Greedy Algorithm and a Simulated Annealing.

In an embodiment, the greedy algorithm can picks up the edge with minimum weight, which means the two most closely spaced buttons. The greedy algorithm checks the degrees of the two nodes of the minimum-weight edge and updates the hotspot of the node with higher degree. The greedy algorithm calculates the centroid of the hotspots of neighboring nodes of the selected node and the new hotspot is calculated as the nearest point on the selected button (or node) to the centroid. While selecting the next node for updating the hotspot, the greedy algorithm checks whether the node is visited earlier and, if so, it selects a different node. The greedy algorithm is greedy in the sense that it only updates the hotspot if the overall value of the cost function is reduced from the previous value.

In an embodiment, the simulated annealing algorithm randomly selects a node and also randomly selects a point on the node as its new hotspot. If a new hotspot reduces the value of the cost function, then it is selected and updated. However, even if the new hotspot increases the value of the cost function, it may still be selected based on the following condition:

$$e^{\frac{(oldCostFn - newCostFn)}{T}} > a$$

random number between 0 and 1, and wherein the value of T runs from 5000 to 1 and reduced by 1 in each iteration.

In an embodiment, both algorithms can run for 5000 iterations.

Figure 7:
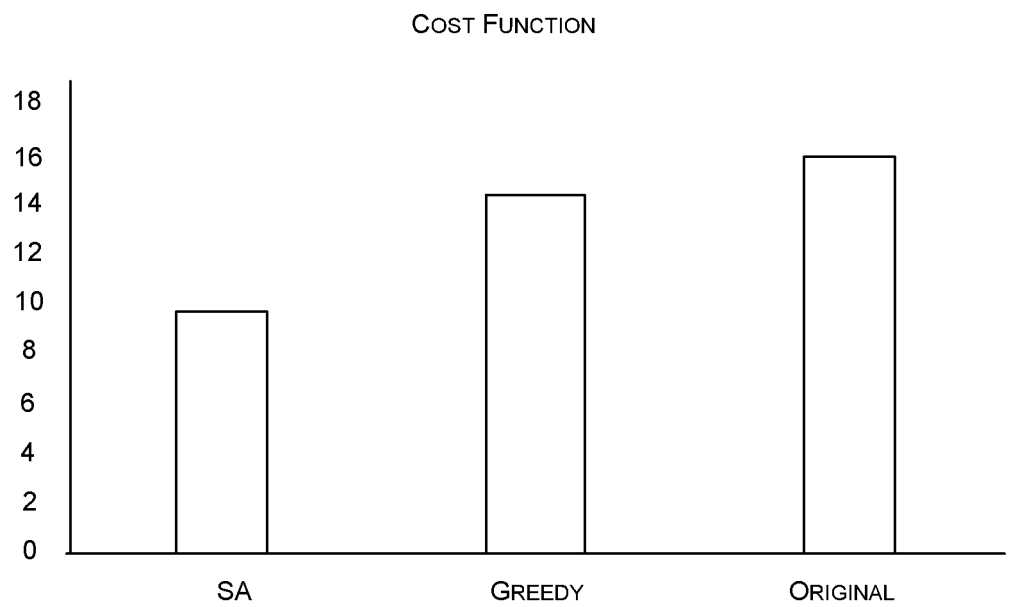
FIG. 7 illustrates an exemplary bar chart representation of the cost function for different algorithms, in accordance with an embodiment of the present disclosure.

FIG. 7 shows the values of the cost function for the minimum value of the cost function obtained in the algorithms. The 'Original' stands for the initial state of the algorithm when all the hotspots are in the middle of each button.

Figure 8:
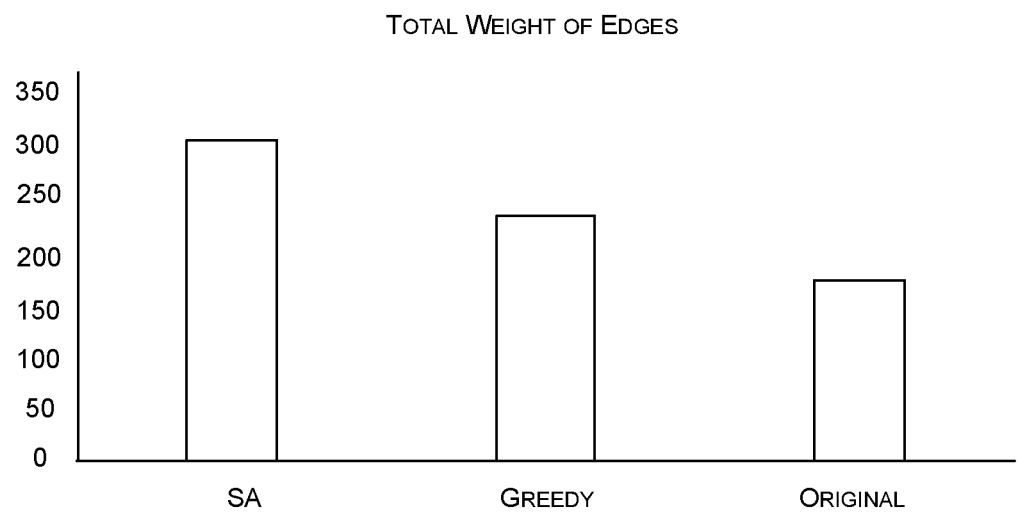
FIG. 8 illustrates an exemplary bar chart representation of total distances among hotspots for different algorithms, in accordance with an embodiment of the present disclosure.

FIG. 8 illustrates an exemplary bar chart representation of total distances among hotspots for different algorithms, in accordance with an embodiment of the present disclosure. It shows the sum of the weight of edges of the graph for the minimum value of the cost function for each algorithm.

In an embodiment, both the simulated annealing and the greedy algorithm can reduce the cost function and can increase the overall weight of edges. The simulated annealing (SA) algorithm reduces the cost function more than the greedy algorithm. The greedy algorithm can stick in cycle and a local optimum after visiting all nodes a couple of times. The SA algorithm never sticks in the local optimum due to randomly choosing node and hotspots. In an embodiment, the weights of edge in the final state of SA can be significantly lower ($p<0.01$) from the initial state in a paired t-test.

Figure 9:
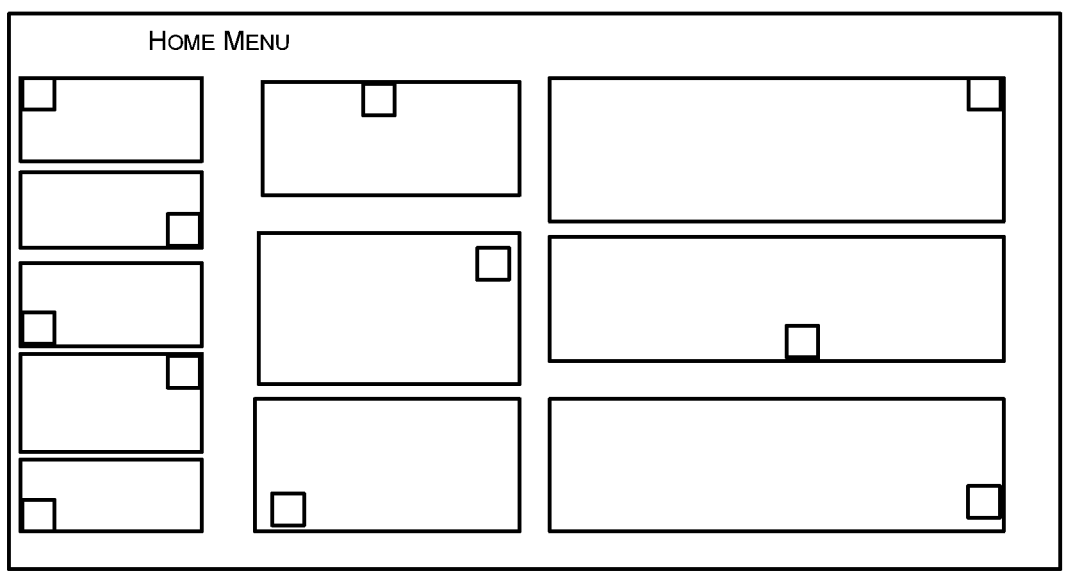
FIG. 9 illustrates an exemplary representation of positions of hot stops on a display of the proposed system, in accordance with an embodiment of the present disclosure.

FIG. 9 illustrates an exemplary representation of positions of hot stops in a display interface of the proposed system. The final positions of hotspots as dots on the buttons after SA as shown in FIG. 9.

Figure 10A:
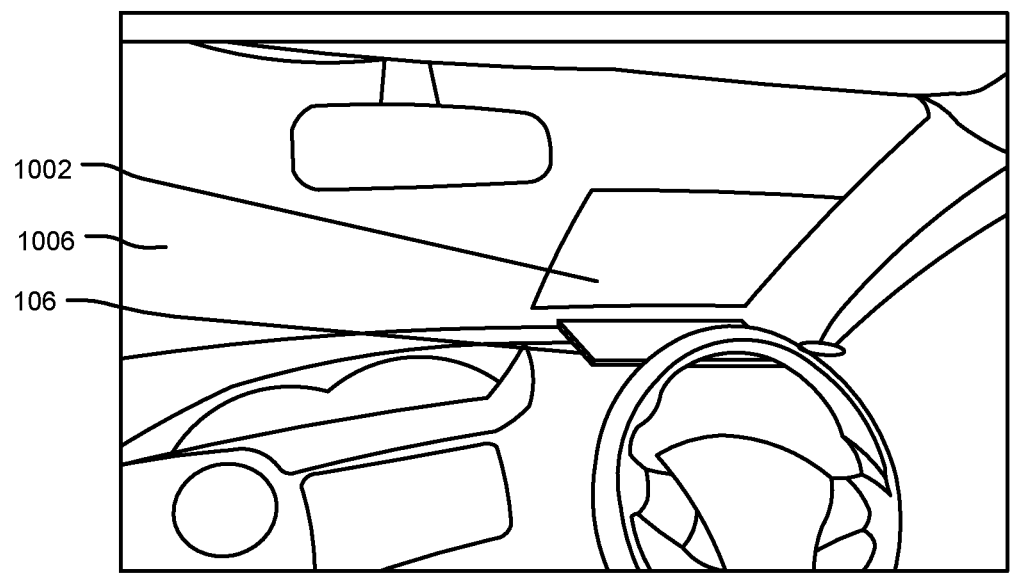
FIGS. 10A and 10B illustrate exemplary implementations of the proposed system in a vehicle for controlling an infotainment system in the vehicle by eye gaze or finger movements, in accordance with an embodiment of the present disclosure.
Figure 10B:
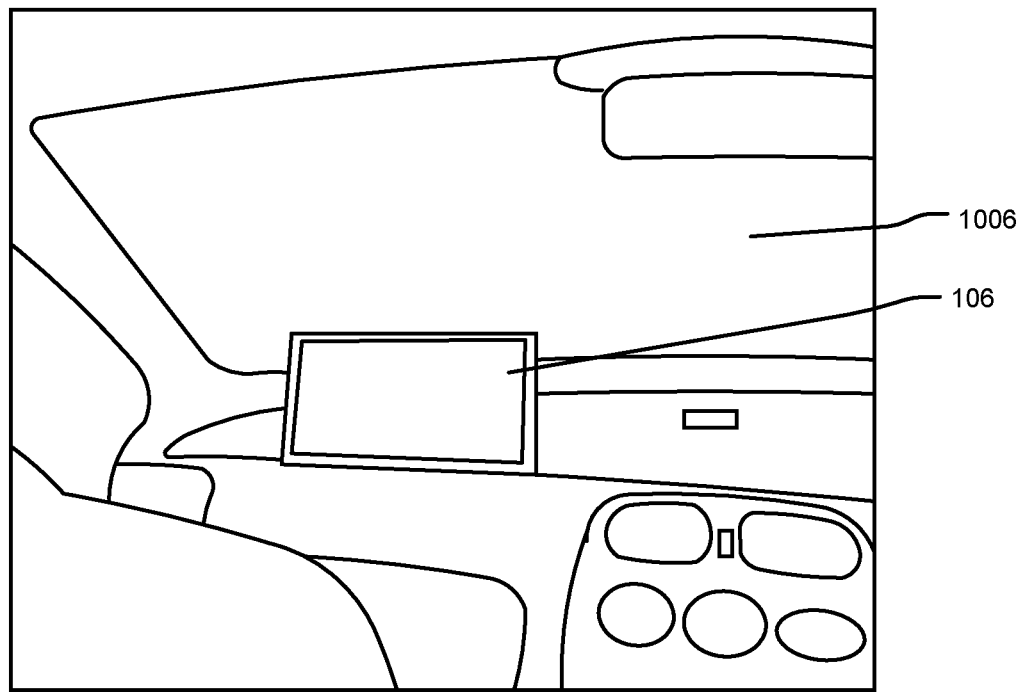

FIGS. 10A and 10B illustrate exemplary implementations of the proposed system in a vehicle for controlling an infotainment system in the vehicle by eye gaze or finger movements, in accordance with an embodiment of the present disclosure. In an embodiment, an interactive reflected display 1002 can be a reflection from a screen of a display unit 106 with high brightness on the curved windscreen 1006 as shown in FIG. 10A. The display unit 106 is configured on dashboard of the vehicle such that display unit enables the reflection on the curved and inclined semi-transparent sheet placed on the windscreen 1006, and can be operated by the driver using eye gaze tracker and the finger tracking sensor.

In another embodiment, the proposed system can be implemented in the vehicle by overlaying controls on the video feed of the tablet computer/display unit 106 placed on dashboard of the vehicle as shown in FIG. 1B. This arrangement allows the vehicle driver to operate the system by eye gaze or finger movement without taking eyes off from road.

Figure 11:
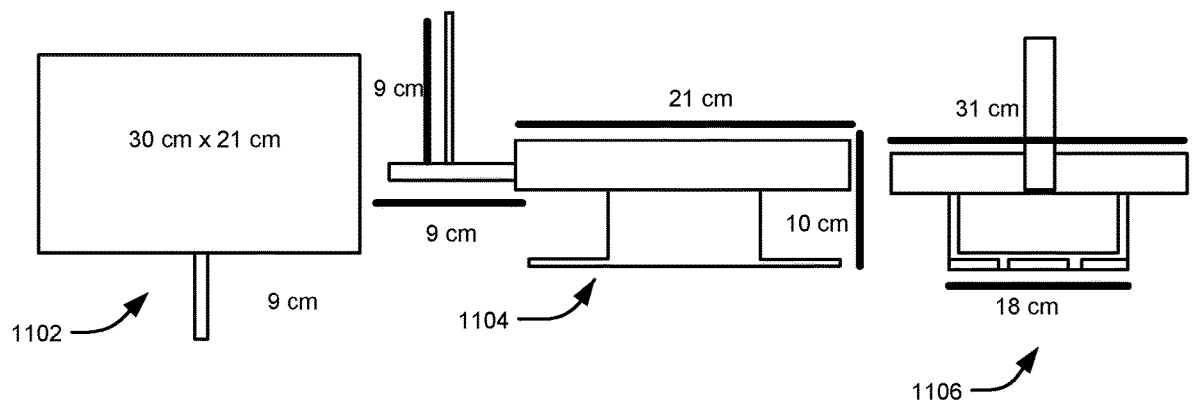
FIG. 11 illustrates an exemplary representation of a supports assembly for holding the proposed system in a vehicle, in accordance with an embodiment of the present disclosure.

FIG. 11 illustrates an exemplary representation of a support assembly for holding the proposed system in a vehicle, in accordance with an embodiment of the present disclosure. In an embodiment, the support assembly can include a rectangular cavity 1102 on top to hold the display unit 106 (also referred to as LCD screen hereinafter) in place, and a magnetic eye gaze tracker holder 1104 for holding a magnetic eye tracker 110 of the system with limited movement allowance. In an embodiment, the support assembly can also include a housing 1106 to accommodate a processor 102 and other sensors such as a vibration sensor, a light sensor and the likes just below the display unit.

In an embodiment, the support assembly can be configured on the dashboard in front of the driver. In an embodiment, the support assembly can be designed in such a way so as not to distract or block the driver's field of view. In an embodiment, the support assembly can be arranged to display the labels and functions of the system clearly and allow the driver (also referred to as operator hereinafter) to interact to the system with minimum effort. The eye tracker holder can allow the eye tracker to be adjusted according to operator position and convenience. In an embodiment, the eye gaze tracker holder 1104 can be slidably configured.

In an exemplary embodiment, the support assembly can be configured with an adhesive base to keep the system in fixed and stable position. In an exemplary embodiment, support assembly can be approximately 31 cm×20 cm×10 cm in size. For instance, the rectangular cavity 1102 (also referred to as screen holder) can be 30 cm×21 cm×3 cm in size, the eye gaze tracker holder 104 (also referred to as sliding assembly hereinafter) can be 9 cm×9 cm×3 cm in size, and the housing 1106 (also referred to as sensor housing) at the base can be 18 cm×20 cm×5 cm in size as shown in FIG. 11.

Figure 12A:
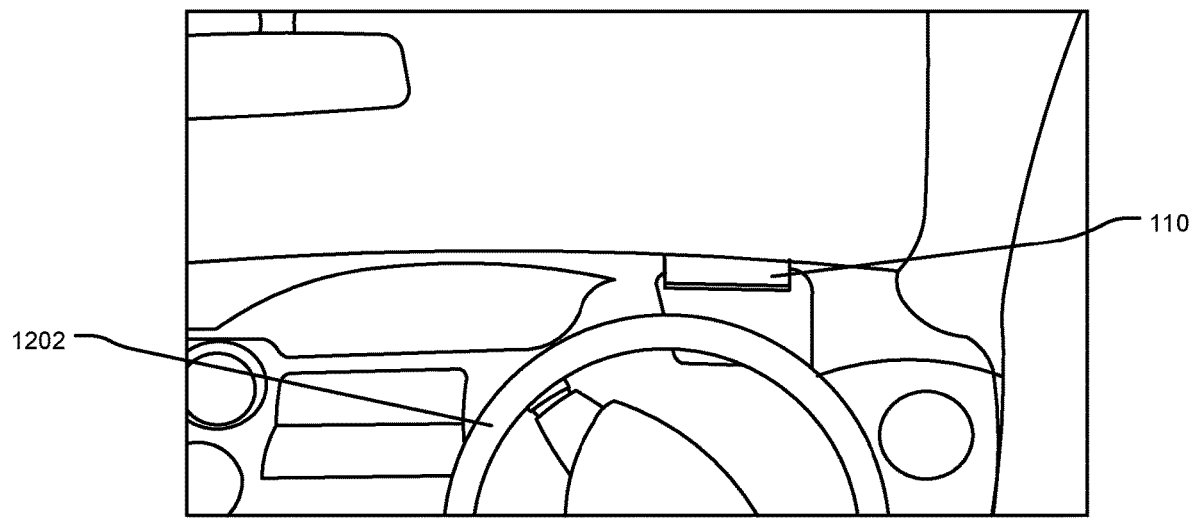
FIGS. 12A and 12B illustrates exemplary representation of a lowest position and highest position, respectively, of a steering wheel of a vehicle with respect to position of an eye tracker of the proposed system, in accordance with an embodiment of the present disclosure.
Figure 12B:
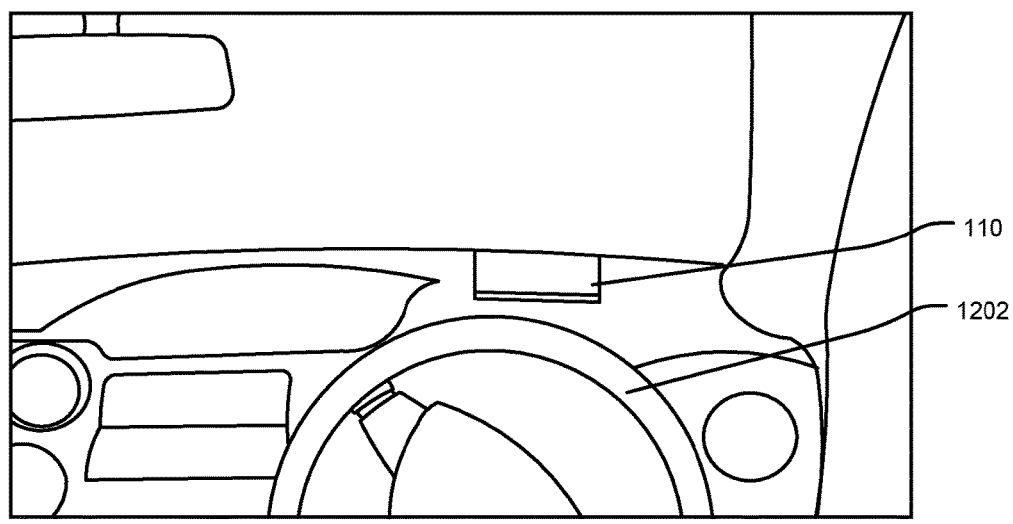

FIG. 12A illustrates exemplary representation of a lowest position of a steering wheel 1202 of a vehicle with respect to position of an eye tracker 110 of the proposed system, in accordance with an embodiment of the present disclosure. FIG. 12 B illustrates exemplary representation of highest position of the steering wheel 1102 of the vehicle with respect to position of the eye tracker 110 of the proposed system. In an exemplary embodiment, the display unit 106 can be powered by car engine using a standard mini USB mobile phone charger.

Figure 13:
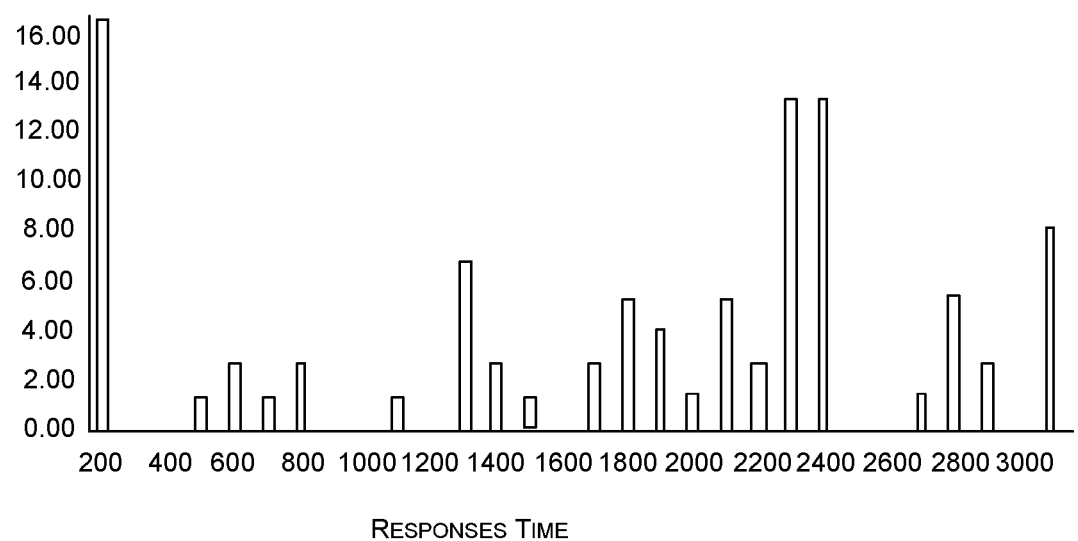
FIG. 13 illustrates an exemplary representation a histogram of response times, in accordance with an embodiment of the present disclosure.

FIG. 13 illustrates an exemplary representation a histogram of response times, in accordance with an embodiment of the present disclosure. In an exemplary embodiment, a data was collected using a standard pointing task displaying 5 targets on screen. Each target was 70×70 pixels in size and one of the buttons was rendered differently than other buttons. Participants were instructed to select the designated target as soon as it appears on screen. Participants were also instructed to adjust the seat based on their normal driving posture. The differences in timestamps between appearance of the target and its selection were measured. 81 pointing tasks was collected. FIG. 13 shows the histogram, the median of selection times was 2.1 secs, average selection time was 1.8 secs and standard deviation was 1.1.

It should be apparent to those skilled in the art that many more modifications besides those already described are possible without departing from the inventive concepts herein. The inventive patent matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure mitigates problem of operator's distraction from his primary task of driving/flying while interacting with a display for secondary task in a vehicle by alleviating need to look down the display and physically touch the interface.

The present disclosure provides an Intelligent Gaze Controlled Head Up Display System in an automotive to alleviate need to physically touch the interface.

The present disclosure provides an Intelligent Gaze Controlled Head Up Display System with a display on the windscreen without obstructing view of the road or the sky ahead.

The present disclosure provides a Head Up Display System that integrates finger tracking as an alternative to gaze tracking based control.

The present disclosure provides a system that integrates dual control for movement of the curser/pointer based on position of eye gaze as well as finger tracking.

We claim:

1. A system for man-machine interaction, the system comprising:
    an interactive display, wherein the interactive display is reflection from a screen of a display device on an inclined and/or a curved surface, wherein the inclined and/or the curved surface is a windscreen of a vehicle, and wherein the display device is selected from a group consisting of a tablet computer, a personal digital assistance, and a mobile smart phone; and
    an eye gaze tracking module, the eye gaze tracking module comprising:
        an eye gaze tracker for tracking eye gaze direction of a user,
    wherein a training unit is to train the eye gaze tracking module using a neural network to predict a real-time set of coordinates for the eye gaze direction of the user based on a created reference data set of coordinates of the display.

2. The system as claimed in claim 1, wherein the system further comprises a finger tracking module to detect presence of a finger of the user and track movement of the finger, a cursor module configured to, on the basis of a received input, move a cursor on the display to an area of interest on the display, and a wireless switch module operatively coupled to the interactive display, wherein the wireless switch module is configured for selecting a target in the area of interest on the display based on position of the cursor on the display.

3. The system as claimed in claim 2, wherein the input of the cursor module is any of the eye gaze direction of the user from the eye gaze tracking module and the presence of the finger from the finger tracking module.

4. The system as claimed in claim 2, wherein a precedence is given to a signal from the finger tracking module over a signal from the eye gaze tracking module, and the position of the cursor on the display is corrected based on detected movement of the finger by moving the cursor in direction of the detected movement of the finger, and wherein when the finger tracking module does not locate the finger of the user within its field, the system resumes to move the cursor based on the detected eye gaze direction of the user.

5. The system as claimed in claim 2, wherein the system further comprises a processor operatively coupled to the eye gaze tracking module, the finger tracking module, the interactive display, the cursor module, and the wireless switch module.

6. The system as claimed in claim 1, wherein the reference data set of coordinates of the display is created based on a set of coordinates for the display determined by the eye gaze tracking module for a corresponding eye gaze direction for each of a plurality of test users.

7. The system as claimed in claim 1, wherein the system further comprises a median filter configured to take median of pixels of continuously recorded eye gaze positions on the display by the eye gaze tracking module.

8. The system as claimed in claim 1, wherein the system further comprises a target prediction unit that highlights a clickable object nearest to a cursor position on the display to the area of interest on the display.

9. The system as claimed in claim 8, wherein the highlighting of the clickable object is based on hotspots associated with each clickable object.

10. The system as claimed in claim 9, wherein the hotspots associated with different clickable objects are selected based on minimizing value of cost function:

$$\sum\nolimits_{\forall d_{ij}} \frac{1}{d_{ij}^2},$$

where $d_{ij}$ is distance between new hotspots on clickable objects i and j.

11. The system as claimed in claim 9, wherein a new hotspot is selected even if increasing value of the cost function, based on the following condition:

$$e^{\frac{(oldCostFn - newCostFn)}{T}} > \text{a random number between 0 and 1}.$$

where T runs from 5000 to 1 and reduced by 1 in each iteration.

* * * * *